United States Patent [19]

Taiani

[11] Patent Number: 4,993,516
[45] Date of Patent: Feb. 19, 1991

[54] SEALED AND PRESSURE BALANCED OIL LUBRICATING SYSTEM

[75] Inventor: Patrick M. Taiani, Bedford, Canada

[73] Assignee: Nova Scotia Research Foundation Corporation, Dartmouth, Canada

[21] Appl. No.: 513,935

[22] Filed: Apr. 24, 1990

[30] Foreign Application Priority Data

Apr. 28, 1989 [CA] Canada .................................. 598202

[51] Int. Cl.$^5$ ............................................... F01M 1/20
[52] U.S. Cl. .................................... 184/6.4; 184/6.23; 184/41
[58] Field of Search ................ 417/445; 184/6.16, 6.4, 184/6.23, 39, 40, 41, 55.1, 108, 104.1

[56] References Cited

U.S. PATENT DOCUMENTS 4,699,250 10/1987 Hiestand .............................. 184/39

FOREIGN PATENT DOCUMENTS 1129469 10/1982 Canada .................................. 310/34
1146207 10/1983 Canada .................................. 310/34

*Primary Examiner*—Larry Jones
*Assistant Examiner*—Alan B. Cariaso
*Attorney, Agent, or Firm*—Jones, Tullar & Cooper

[57] ABSTRACT

A sealed and pressure balanced lubricating system for high pressure rotary equipment includes a housing with a bore divided by a slidable piston into a lubricant chamber and a gas chamber. The gas chamber communicates with an area of the equipment which is exposed to high gas pressure and the lubricant chamber communicates with bearings within the equipment. During operation gas pressure forces the piston against the lubricant to pressure feed the bearings. A relief valve in the piston is opened, after the equipment stops and the pressure therein returns to atmospheric, in the event that pressurized gas has become entrained in the lubricant due to leakage past shaft seals. Such gas forces the piston back towards the gas chamber; the relief valve contacts an actuator and is opened; and the gas escapes to atmosphere through the piston and the gas chamber. The invention prevents problems due to high pressure gas entrained in lubricants of high pressure rotary equipment by quickly exhausting such entrained gases when the system pressure returns to atmospheric.

11 Claims, 3 Drawing Sheets

SEALED AND PRESSURE BALANCED OIL LUBRICATING SYSTEM

The present invention relates to a balanced lubricating system for lubricating bearings associated with rotary equipment exposed to high pressure gases.

BACKGROUND OF THE INVENTION

There are many uses for vessels which may be required to withstand high internal pressures, say up to and even beyond 20,000 p.s.i., whether in the laboratory, industry or the military. One example is a decompression chamber for deep-sea divers, which chamber requires a power source to operate equipment therein, such as rotary gas pumps for circulating the breathing gas mixture through carbon dioxide scrubbers to remove the carbon dioxide. Another example is a high-pressure autoclave used to treat materials at upwards of 10,000 p.s.i. (680 atmospheres) and which may require rotary equipment therein to circulate gases at the high pressures within the autoclave. It is not practical or safe to install electrical motors within such chambers and hence the drive for the rotary equipment for such devices must be external to the pressure chamber. It is, of course, necessary to transfer power from a drive motor through the wall of the pressure chamber without permitting the escape of any pressurized gases from the chamber.

Commonly assigned Canadian Patent Nos. 1,129,469 of Aug. 10, 1982 and 1,146,207 of May 10, 1983 illustrate two magnetic drives which successfully transfer power to high pressure chambers. Copending Canadian Application No. 585,241 of Dec. 7, 1988 illustrates another such device.

The prior art drives have, in common, a drive shaft which extends through the pressure chamber wall from the exterior drive system to the interior driven system. The shaft bearings within and without the pressure chamber must be lubricated by a suitable lubricant such as oil. During operation of the rotary equipment, however, it is impossible to prevent small amounts of pressurized gas from entering the oil and, when operations cease and the pressure chamber returns to atmospheric pressure, the gas which entered the oil under pressure will expand (perhaps by a factor of 680), causing all sorts of lubricating problems, not the least of which is loss of oil and consequent bearing damage. There is, therefore, a need in such equipment for a lubricating system which compensates for any leakage of high pressure gas into the lubricant so that when pressures within the rotating equipment are reduced such gas as may be trapped in the lubricant will not cause problems within the lubricant system.

SUMMARY OF THE INVENTION

The present invention meets the above requirement by providing a balanced lubrication system which is, for all intents and purposes, a closed loop system. With the invention the lubricating system is pressurized to slightly above the internal operating pressure of the rotating equipment so that, preferably, if there is any leakage there will be a leakage of lubricant into the gas rather than vice versa. However, should there be gas leakage into the lubricant, the lubricant system will release any high pressure gas trapped in the lubricant back to the gas portion of the system during pressure reduction so that such trapped gas will not have an opportunity to expand greatly within the lubricant.

The invention uses a housing capable of withstanding the operating pressures of the rotary equipment, the housing being divided internally by a reciprocable piston having a one-way pressure relief valve therein. Lubricant is contained within a lubricant chamber on one side of the piston and is communicated to the bearings by appropriate conduits. The other side of the piston is a gas chamber connected via a passageway to an area of the rotary equipment which is exposed to the high operating pressures of the equipment. The gas chamber includes a rod or other device for opening the relief valve in the piston should the relief valve contact the rod and the gas chamber also includes a spring for applying a preload on the piston, and hence on the lubricant within the lubricant chamber, the preload being in the order of 14 p.s.i.

When the rotary equipment is at operating pressure the gas chamber will be at the same pressure and the piston will be forced towards the lubricant in the lubricant chamber to lubricate the bearings of the equipment. When the equipment ceases to operate and the pressure therein drops to atmospheric the piston will return towards the gas chamber until balanced by the preload spring. If there is any high pressure gas entrapped in the lubricant due to leakage, that gas will migrate to the lubricant chamber as it expands and act on the piston to drive it towards the gas chamber. Such movement brings the relief valve into contact with the actuating rod, causing the relief valve to open so as to release the pressurized gas to the gas chamber and hence to atmosphere. A small amount of lubricant may be lost but it can be easily replenished.

Broadly speaking, therefore, the present invention may be seen as providing a balanced lubricating system for lubricating bearings associated with rotating equipment exposed to high pressure gases to offset any leakage of such gases into the lubricant comprising: high pressure housing means closed at each end thereof; conduit means leading from one end of the housing means to the bearings to be lubricated; reciprocable piston means slidably and sealingly contained within the housing means intermediate the ends thereof, the piston means serving to divide the housing means into a lubricant chamber and a gas chamber; spring biased relief valve means within the piston means, the opening direction of the relief valve means relative to the piston means being towards the lubricant chamber; relief valve actuation means within the gas chamber; spring biasing means within the gas chamber for applying a preload on the piston means in the direction of the lubricant chamber; and passage means connecting the gas chamber to an area within the equipment which, during operation thereof, will be exposed to high pressure gases; whereby (i) as the equipment operates pressured gas from the area will be communicated via the passage means to the gas chamber to bias the piston means against lubricant in the lubricant chamber so as to transmit lubricant therefrom to the bearings via the conduit means; and (ii) when the equipment ceases to rotate and the area and gas chamber are returned to atmospheric pressure any pressurized gas which has leaked into the lubricant will migrate to the lubricant chamber and move the piston means towards the gas chamber due to the pressure differential thereacross, such movement bringing the relief valve means into engagement with the actuation means to open the relief valve means and thereby permit the pressurized gas in the lubricant to escape to the gas chamber through the piston means and hence escape to atmosphere.

The invention will now be described with reference to the drawings.

DESCRIPTION OF THE PREFERRED EMBODIMENT

Figure 1:
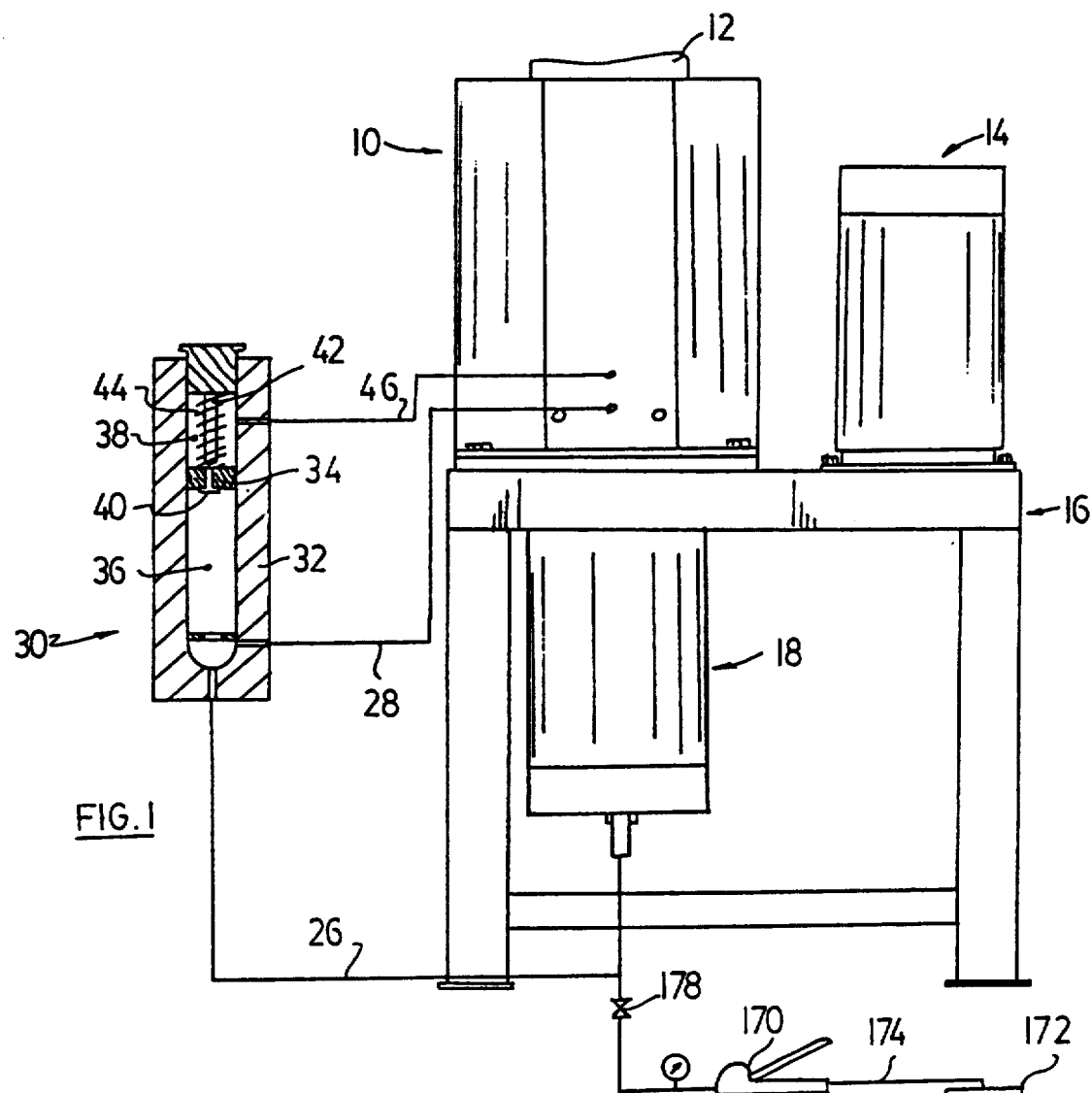
FIG. 1 is a schematic view of the environment in which the present invention might be utilized.

FIG. 1 illustrates, somewhat schematically, a practical application for the present invention. FIG. 1 shows a blower housing 10 containing rotary equipment, such as a blower or impeller which can create high pressure moving air therein, which air is communicated via conduit 12 to an autoclave or a hyperbaric chamber (not shown). A motor 14 mounted to a table 16 along with blower housing 10 drives a magnetic drive 18 in a manner as described in the aforementioned pending application or in Canadian Patent No. 1,129,469. The magnetic drive includes a shaft 20 (FIG. 2) which passes into the blower housing 10 and is supported rotationally by bearings 22, 24 in the drive and the blower housing respectively.

Lubricant for the bearings 22, 24 is supplied via conduits 26, 28 from a balanced lubricant supply unit 30 which is at the heart of this invention and is only shown schematically in FIG. 1. The important features thereof are the high pressure housing 32, the reciprocable piston 34 dividing the housing into a lubricant chamber 36 and a gas chamber 38, the relief valve 40 in the piston 34, the actuating rod 42 in the gas chamber, and the preload spring 44 also in the gas chamber. The gas chamber 38 communicates with an area within the blower chamber which is exposed to the high operating pressures therein by a passage or conduit 46.

Figure 2:
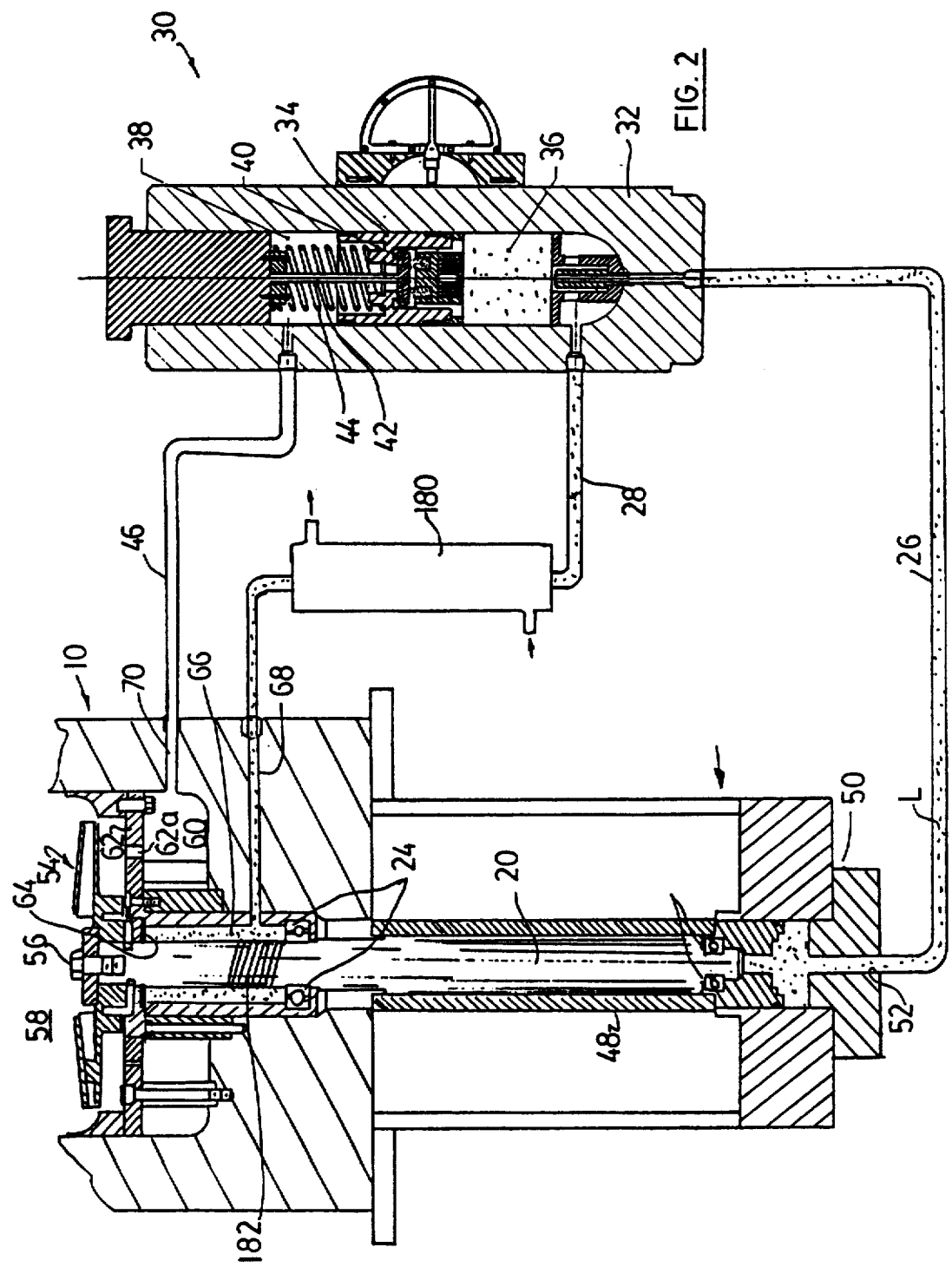
FIG. 2 is a more detailed representation of the invention showing more detail thereof.

With reference to FIG. 2 the magnetic drive means 18 typically includes a laminated hyperbaric barrier 48 surrounding the shaft 20. Lubricant can pass along the shaft between the bearings 22, 24 along the narrow circumferential gap (not shown) between the shaft and the barrier 48. At the tail end 50 thereof the drive 18 includes a port 52 to which conduit 26 can be connected so that lubricant L therein has access to the lower end of shaft 20 and hence to the bearings 22. Further details of the magnetic drive 18 are not required for a full understanding of the present invention.

The blower housing 10 contains the rotary equipment, such as an impeller or blower 54, connected to the shaft 20 by suitable means such as bolt 56. During rotation of the impeller 54 the area 58 will be at the operating pressure of the blower and such pressure will be communicated to the area 60 by way of openings 62a in the mounting flange 62. A dynamic lip seal 64 is provided for engagement with the shaft 20 during rotation thereof, which seal serves to prevent lubricant from escaping from the lubricant space 66, which space contains the bearings 24 and is connected via port 68 with the lubricant conduit 28. Port 70 through the blower housing 10 connects the high pressure area 60 with the gas passage 46. As with the magnetic drive 18 further details of the bloer housing 10 are not required for an understanding of the present invention.

Figure 4:
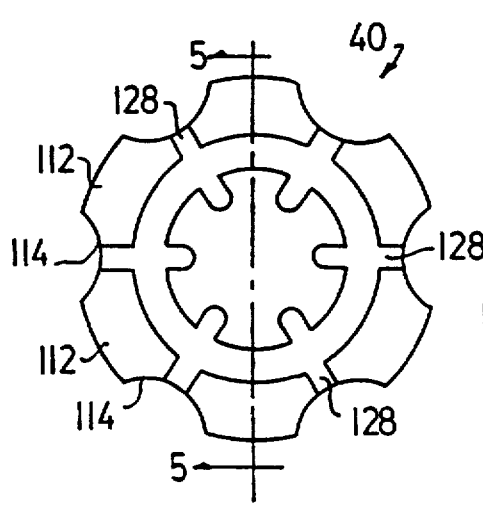
FIGS. 4 and 5 show respectively a plan view and a transverse cross-section on the line 5—5 of the relief valve of this invention.
Figure 5:
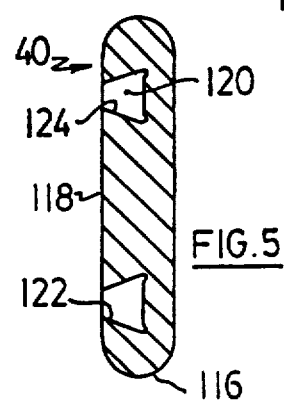
Figure 3:
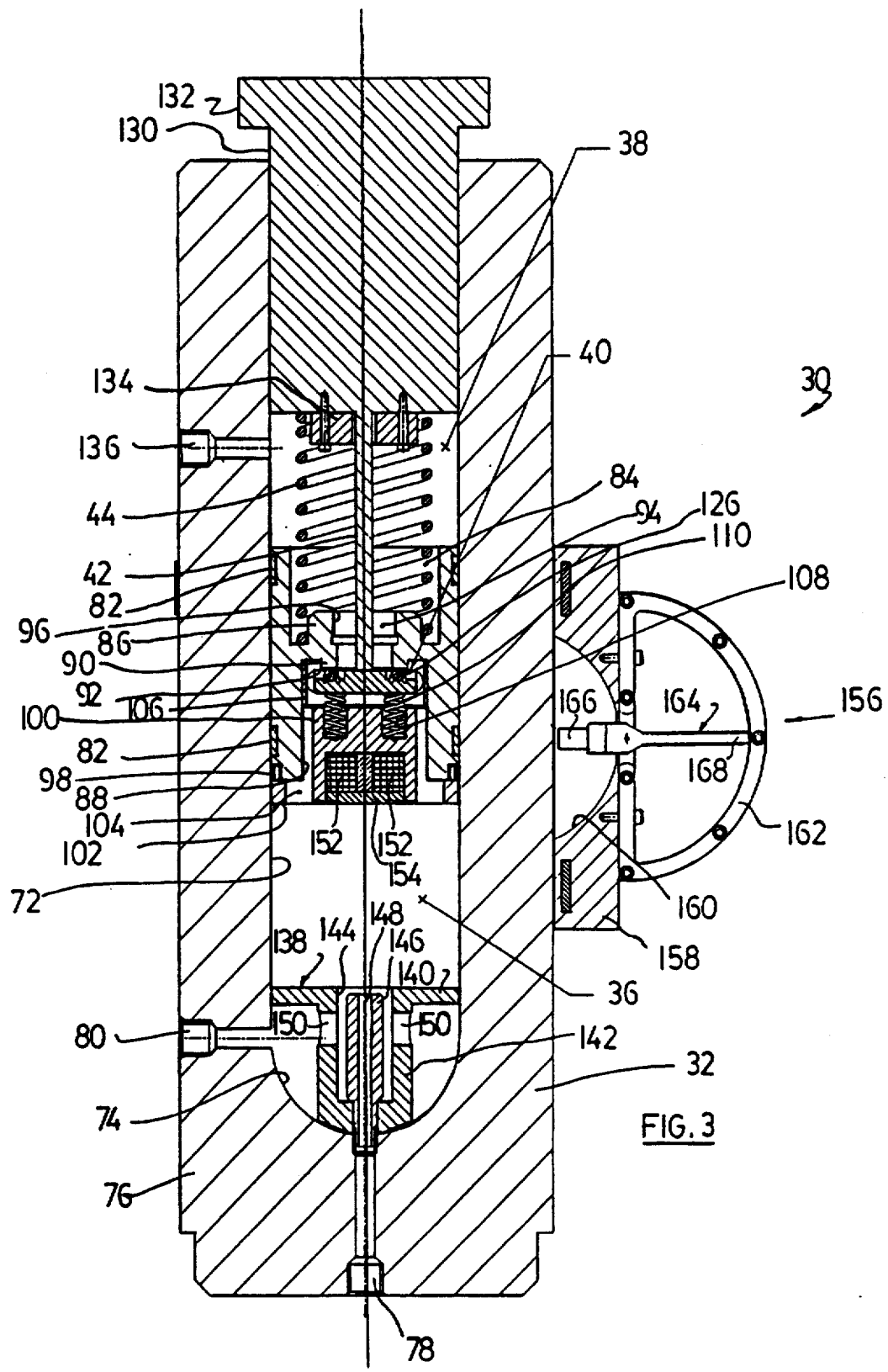
FIG. 3 is a detailed cross-section of the main balancing unit of the present invention.

Turning now to FIGS. 3, 4 and 5 further details of the balancing unit 30 will now be described. Unit 30 includes an elongated, generally cylindrical high pressure housing 32 which includes a cylindrical axially extending bore 72 therein, open at one end only. At the other end the bore 72 terminates at a hemispherical end wall 74 contained within housing end wall 76. Lubricant outlet ports 78, 80 extend through the housing 32 for connection to conduits 26, 28 respectively (see FIG. 2) and communicate those conduits to the bore 72.

Piston 34 is slidably and sealably reciprocable within the bore 72, dividing the bore into a lubricant chamber 36 on one side thereof and a gas chamber 38 on the other side thereof. Ports 78, 80 communicate with the lubricant chamber portion of bore 72.

The piston 34 is generally cylindrical and is provided with circumferentially extending split wear rings 82 within mating recesses machined in the outer surface of the piston. A blind bore 84 extends into the piston 34 from the gas chamber side thereof and boss portion 86 of the piston extends into the bore 84 from the blind end thereof. A blind bore 88 extends into the piston 34 from the lubricant chamber end and an annular boss 90 defines an annular valve seat 92 thereon. An axial bore 94 extends through the central portion of the piston to communicate bore 84 with bore 88. If desired, the gas chamber end of bore 94 may be internally threaded as at 96 for purposes to be described hereinafter.

At the lubricant chamber end an annular radial seal 98 is provided in an annular recess of the piston 34 to seal the piston relative to the bore 72. Seal 98 is a commercially available seal comprising a TEFLON (trade mark) cover over a stainless steel spring.

A cylindrical relief valve retainer 100 is located within blind bore 88, retainer 100 including a cylindrical flange portion 102 which engages the end face of the piston and is secured thereto by machine screws (not shown), the heads of which are recessed or countersunk in the flange portion 102. Preferably four such screws are used, the screws alternating with axially extending bores 104. Between the inner end of retainer 100 and the inner end of the blind bore 88 there is positioned a thin cylindrical sleeve 106. Sleeve 106 and split rings 82 are made from a smooth plastics material such as RULON (trade mark).

A plurality, such as four, of axially extending blind bores 108 extend into the inner end face of retainer 100, each bore 108 receiving a stainless steel compression spring 110, which springs normally extend beyond the retainer inner face and support the relief valve 40 thereon. Each spring 110 typically has a spring force of about 7 lbs.

The relief valve 40 is best shown in FIGS. 4 and 5 wherein it is seen as a lobed disk having outer lobes 112 separated by arcuate recesses 114. The lobes 112 are formed with a transversely rounded edge 116 which is adapted to contact the sleeve 106 and to be centered thereby. The face 118 of valve 40 which faces inwardly has an annular, generally trapezoidal groove 120 therein, the radially outer and inner walls 122, 124 of the groove converging towards the face 118. Groove 120 receives an 0-ring 126 (FIG. 3) which projects slightly beyond face 118 for sealing engagement with the annular valve seat 92. In order to prevent the high pressures encountered in the unit 30 from dislodging the O-ring 126 the groove 120 communicates with the exterior of the relief valve via radially directed grooves 128 which extend to the recesses 114.

The gas chamber 38 is closed by way of a plug 130 which sealingly is secured within the bore 72. Preferably the plug 130 is removable for disassembly of the unit 130 and hence mating threads can be provided on the plug 130 and the bore 72, the enlarged head 132 of the plug being used to apply a rotational force thereto to remove the plug. The plug at its inner end has the cylindrical actuating rod 42 formed integrally therewith, the rod extending through the gas chamber 38 axially thereof and into the axial bore 94 of the piston 34 to adjacent the face 118 of the relief valve 40.

The preload or bias spring 44 is also contained within gas chamber 38 and extends inwardly thereof from plug 130, surrounding actuating rod 42. A spring retainer 134 secures one end of the spring 44 to the plug 130, the other end of spring 44 extending into blind bore 84 of the piston and engaging the boss 86 therein. Typically the spring 44 will apply a spring force of about 55 lbs. against the piston 34 in operation. If plug 130 and spring 44 are removed a threaded rod (not shown) may be threaded into the threads 96 in piston 34 to remove the piston from the unit or to push it further into the lubricating chamber 36.

Gas port 136 in the housing 32 communicates the gas chamber 38 with the passage or conduit 46 which in turn leads to the high pressure area 60 in the blower housing 10.

At the lower end of lubricant chamber 36 there is a piston stop and flow directing member 138. Member 138 has a cylindrical flange 140 sealingly engaging the wall of bore 72 and a cylindrical foot 142 extending to the end face of hemispherical end 74. A bore 144 in member 138 receives a cylindrical flow divider 146 which in turn has an axial bore 148 communicating with port 78. Radial ports 150 in the foot 140 communicate with the port 80.

Lastly, the retainer 100 is provided with a blind bore in the end facing the lubricant chamber 36, which bore receives therein a set of magnets 152 held therein by a non-magnetic retainer 154. The magnets 152 are all oriented to have the same magnetic pole facing outwardly. The magnets 152 are intended to cooperate with an indicator device 156 positioned exterior to housing 32 so as to provide a visual indication of the piston position with the balancing unit 30.

Indicator device 156 includes a base 158 secured to the housing 32 in any suitable manner and having an arcuate cut-out or recess 160 therein. An arcuate, protractor-like bar 162 is attached to base 158 in any suitable manner and may carry appropriate chart means or indicia such as coloured zones (green for normal operation, red for danger) and/or degree or position markings. A pointer 164 is pivotally mounted to base 158 and has a magnet 166 closest to housing 32 being opposite to the outer pole of magnets 152. The opposite end 168 of pointer 164 is adjacent the bar 162 so that upwards or downwards movement of piston 34 is magnetically detected by the magnet on pointer 164 and indicated by the position of pointer end 168 relative to bar 162.

Three further features of the present invention will be described before discussing the operation of the invention. First of all in FIG. 1 a hand pump 170 is shown connected to a lubricant reservoir 172 via line or conduit 174 and, via line 176 and check valve 178, to the conduit 26. By using the pump 170 the balancing system may be topped up with lubricant from reservoir 172 should the necessity arise. Secondly, with reference to FIG. 2, a heat exchanger 180 may be provided on the conduit 28 and/or on the conduit 26 to cool the lubricant flowing through the conduit(s) to the bearings. A suitable coolant, such as water, may flow through the heat exchanger in the direction of the arrows to remove heat from the lubricant. This feature will be very useful for equipment used in hot environments or wherein a great deal of heat, perhaps upwards of 300° C., is generated within the rotary equipment. Finally, it may be desirable to machine a spiral groove 182 in the shaft 20 so as to promote movement of the lubricant towards the bearing 24.

OPERATION

At static conditions, without the shaft 20 rotating, and the lubricant system topped up with lubricant, the bias or preload spring 44 will apply a preload force of about 12 to 14 p.s.i. on the piston 34, ensuring that there is always lubricant supplied to the bearings 22, 24. As the shaft 20 and the rotary equipment connected thereto come up to speed there will be a considerable increase in pressure in the areas 58, 60 and that pressure will be communicated, via port 70, passage 46 and port 136, to the gas chamber 38. Such pressure, over and above the preload on the piston 34 from spring 34, will act on the piston 34 and hence on the lubricant in chamber 36, lines 26, 28 and in the bearing spaces. Due to the preload from spring 44 the lubricant pressure should always be slightly greater than the gas pressure and that should be sufficient to keep any gas from infiltrating into the lubricant, as for example across the lip seal 64.

In a real life, however, pressurized gas, albeit in very small volumes, does infiltrate the pressurized lubricant and can cause considerable damage when the pressure in the rotary equipment is reduced to atmospheric. When that happens with the present invention the pressurized gas in the lubricant attempts to expand in the lubricant chamber 36. That has the effect of driving the piston 34, due to the pressure differential thereacross, towards the gas chamber 38. During such movement the relief valve 40 encounters the end of actuating rod 42, is prevented thereby from moving with the piston, and hence the seal between O-ring 126 and seat 92 is broken. .The pressurized gas from the lubricant can escape through bores 104 in retainer 100, past the O-ring 126 and seat 92, through the axial bore 96 in piston 34 to gas chamber 38 and then to atmosphere through the rotary equipment. Once the gas has escaped and the pressure within the lubricant chamber has fallen to normal the spring 44 will move the piston 34 backwards so that the relief valve 40 will close thereagainst.

Should there be a prolonged loss of lubricant without topping up, as for example across lip seal 64, the piston 34 will move lower in bore 72 due to the depleted lubricant. Such movement will be apparent from the movement of pointer 164 and should signal an operator that topping up is required. Pointer 164 could even actuate an audible or visible alarm in the event that too much lubricant is being lost. Should the piston 34 move so far down in bore 72 that it encounters stop member 138 there could still be enough pressure to keep whatever lubricant remains flowing to the bearings since the gas pressure would open the relief valve 40 and then operate directly on the lubricant itself. This of course is not desirable but it is better than failure due to inadequate lubrication.

Although the present invention was devised for the type of rotary equipment described herein it is clear that the invention could be used with other types of rotary equipment which are subjected or exposed to high pressures and require constant lubrication of bearings and other rotating parts. It is expected that a skilled practitioner could effect changes within the confines of the present invention without departing from the spirit thereof. Hence the protection to be afforded this invention is to be determined from the scope of the claims appended hereto.

The embodiments of the invention in which an exclusive property of privilege is claimed are defined as follows:

1. A balanced lubricating system for lubricating bearings associated with rotating equipment exposed to high pressure gases to offset any leakage of such gases into the lubricant comprising:
   (a) high pressure housing means closed at each end thereof;
   (b) conduit means leading from one end of said housing means to the bearings to be lubricated;
   (c) reciprocable piston means slidably and sealingly contained within said housing means intermediate the ends thereof, said piston means serving to divide said housing means into a lubricant chamber and a gas chamber;
   (d) spring biased relief valve means within said piston means, the opening direction of said relief valve means relative to said piston means being towards said lubricant chamber;
   (e) relief valve actuation means within said gas chamber;
   (f) spring biasing means within said gas chamber for applying a preload on said piston means in the direction of said lubricant chamber; and
   (g) passage means connecting said gas chamber to an area within said equipment which, during operation thereof, will be exposed to high pressure gases;
   whereby (i) as said equipment operates pressured gas from said area will be communicated via said passage means to said gas chamber to bias said piston means against lubricant in said lubricant chamber so as to transmit lubricant therefrom to said bearings via said conduit means; and (ii) when said equipment ceases to rotate and said area and gas chamber are returned to atmospheric pressure any pressurized gas which has leaked into said lubricant will migrate to said lubricant chamber and move said piston means towards said gas chamber due to the pressure differential thereacross, such movement bringing said relief valve means into engagement with said actuation means to open said relief valve means and thereby permit the pressurized gas in said lubricant to escape to said gas chamber through said piston means and hence escape to atmosphere.

2. The system of claim 1 wherein said housing means includes a longitudinally extending blind bore therein, extending from the other end of said housing means, and a plug sealing secured within said bore at said other end, said gas chamber being defined between said piston means and said plug.

3. The system of claim 2 wherein said actuating means comprises an actuating rod connected at one end to said plug and extending axially of said gas chamber so that the other end of said rod is normally located adjacent said relief valve means.

4. The system of claim 3 wherein said spring biasing means comprises a helical compression spring extending along said rod and abutting said plug at one end and said piston means at the other end thereof.

5. The system of claim 4 wherein said piston means comprises a cylindrical piston having axially spaced apart peripheral wear rings at the outer surface thereof for sliding engagement with said longitudinally extending blind bore, peripheral seal means at the outer surface thereof for sealing engagement with said bore, a first blind bore extending from the gas chamber into said piston and receiving the other end of said compression spring, a second blind bore extending from the lubricant chamber into said piston, an axial bore extending through said piston to communicate said first blind bore with said second blind bore, and an annular valve seat within said second blind bore about said axial bore, said relief valve means normally preventing flow past said valve seat.

6. The system of claim 5 wherein said relief valve means comprises a spring biased relief valve member within said second blind bore, an O-ring seal in an annular groove of said valve member sealingly engageable with said valve seat, pressure relief groove means communicating with said annular groove, and peripherally spaced apart axially extending recesses in said valve member to permit flow therepast.

7. The system of claim 6 including a valve retainer secured within said second blind bore, said retainer including axially extending bores communicating said lubricant chamber with said axially extending recesses, a plurality of spring retaining bores adjacent said valve member, and a helical compression spring in each spring retaining bore, said helical compression springs serving to bias said valve member towards said valve seat.

8. The system of claim 7 wherein said valve retainer includes first magnet means therein, there being an indicator device secured exteriorally of said housing means and including a pivotal pointer member having second magnet means at one end adjacent said housing means and adapted to indicate the position of said piston within said housing means on corresponding chart means adjacent the other end thereof.

9. The system of claim 1 including heat exchanger means surrounding said conduit means for reducing the temperature of lubricant carried by said conduit means.

10. The system of claim 1 including lubricant reservoir and pump means for topping up said lubricant chamber in the event of lubricant loss.

11. The system of claim 2 including stop and distributor means adjacent the blind end of said longitudinally extending blind bore, serving to distribute lubricant to said conduit means and to limit movement of said piston means within said blind bore.

* * * * *